Dec. 28, 1926. 1,612,683
DE WITT H. WHEATON
DETACHABLE SPUR DEVICE FOR AUTO VEHICLE WHEELS
Filed June 25, 1920 2 Sheets-Sheet 1

INVENTOR
DeWitt H. Wheaton,
BY
ATTORNEYS

Dec. 28, 1926.  1,612,683
DE WITT H. WHEATON
DETACHABLE SPUR DEVICE FOR AUTO VEHICLE WHEELS
Filed June 25, 1920   2 Sheets-Sheet 2
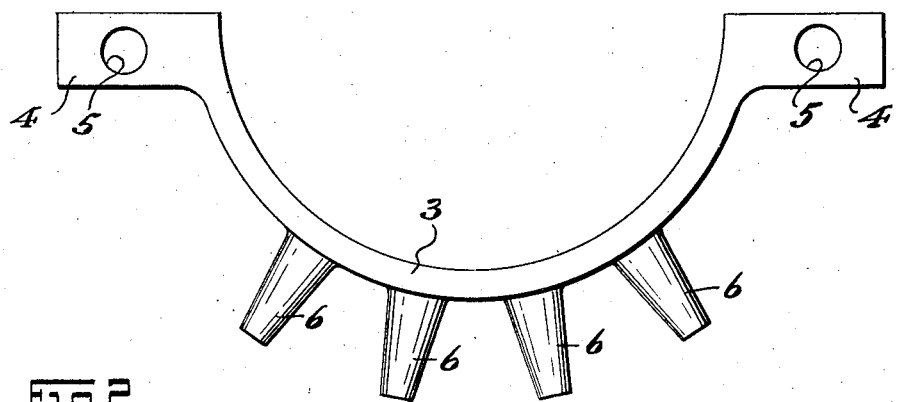
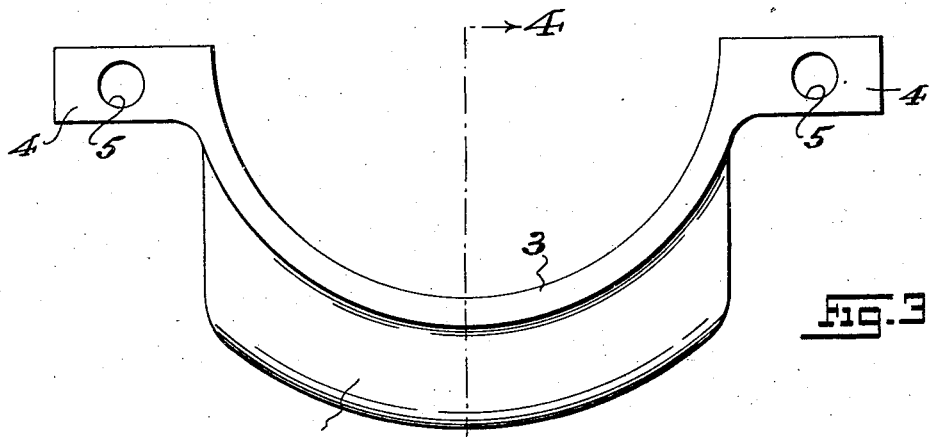
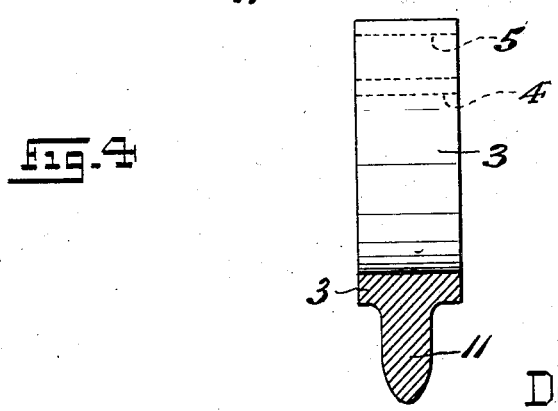
INVENTOR
DeWitt H. Wheaton,
BY
Frantzel and Richards
ATTORNEYS Patented Dec. 28, 1926.

1,612,683

UNITED STATES PATENT OFFICE.

DE WITT H. WHEATON, OF EAST ORANGE, NEW JERSEY.

DETACHABLE SPUR DEVICE FOR AUTOVEHICLE WHEELS.

Application filed June 25, 1920. Serial No. 391,766.

The present invention has reference, generally, to an improved detachable spur device for use on the driving wheels of autovehicles; and the invention relates, more particularly, to an attachment for application to the treads of the driving wheels of auto-vehicles to prevent spinning of the same when mired or stalled in mud, deep snow, sand or other soft spots in the road over which the vehicle is traveling, and which when applied under such circumstances acts as a spur to the traction of the wheels enabling the same to acquire sufficient grip or purchase to force the vehicle forward, and thereby rescue the same from the mired or stalled state.

The invention has for its principal object to provide a novel spur attachment for autovehicle wheels for the purposes above mentioned, which is simple, easily applied and very effective in operation; the same comprising essentially a curvilinear or bowed main body adapted to embrace transversely the tread portion of the vehicle wheel, said body having outwardly projecting spur members, and flexible means for detachably connecting the ends of said body around the inner side of the felly of the wheel, said flexible means and body encircling the felly and tread portion in a plane transverse thereto and being free to swing into a more oblique plane under the strain of use. The object attained by this construction is to enable the encircling member to always lie as a whole in substantially a single plane transverse to the wheel felly and tread, and wedge itself so tightly thereon in use as to hold the spur members in projecting position and prevent turning of the body into edgewise position with respect to the tire. The flexible connection allows such swinging in the plane of the wheel, and also preferably permits hinge motion in a direction at right angles to said plane so as to obtain a close fit of the encircling member formed by the flexible connection and main body. In practice one or more of said main bodies suitably interconnected with chains or other flexible ties are secured to the vehicle wheel.

Other objects of the present invention, not at this time more particularly enumerated, will be clearly understood from the following detailed description of the same.

With the various objects of the present invention in view, the same consists, primarily, in the novel construction of detachable spur device for auto-vehicle wheels hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 2 is a side elevation of one of the transverse main bodies providing the novel spur element of the present invention; Figure 3 is a similar side elevation of a slightly modified form of the novel spur element; and Figure 4 is a detail vertical cross-section, taken on line 4—4 in said Figure 3.

Similar characters of reference are employed in all of the hereinabove described views, to indicate corresponding parts.

Figure 1:
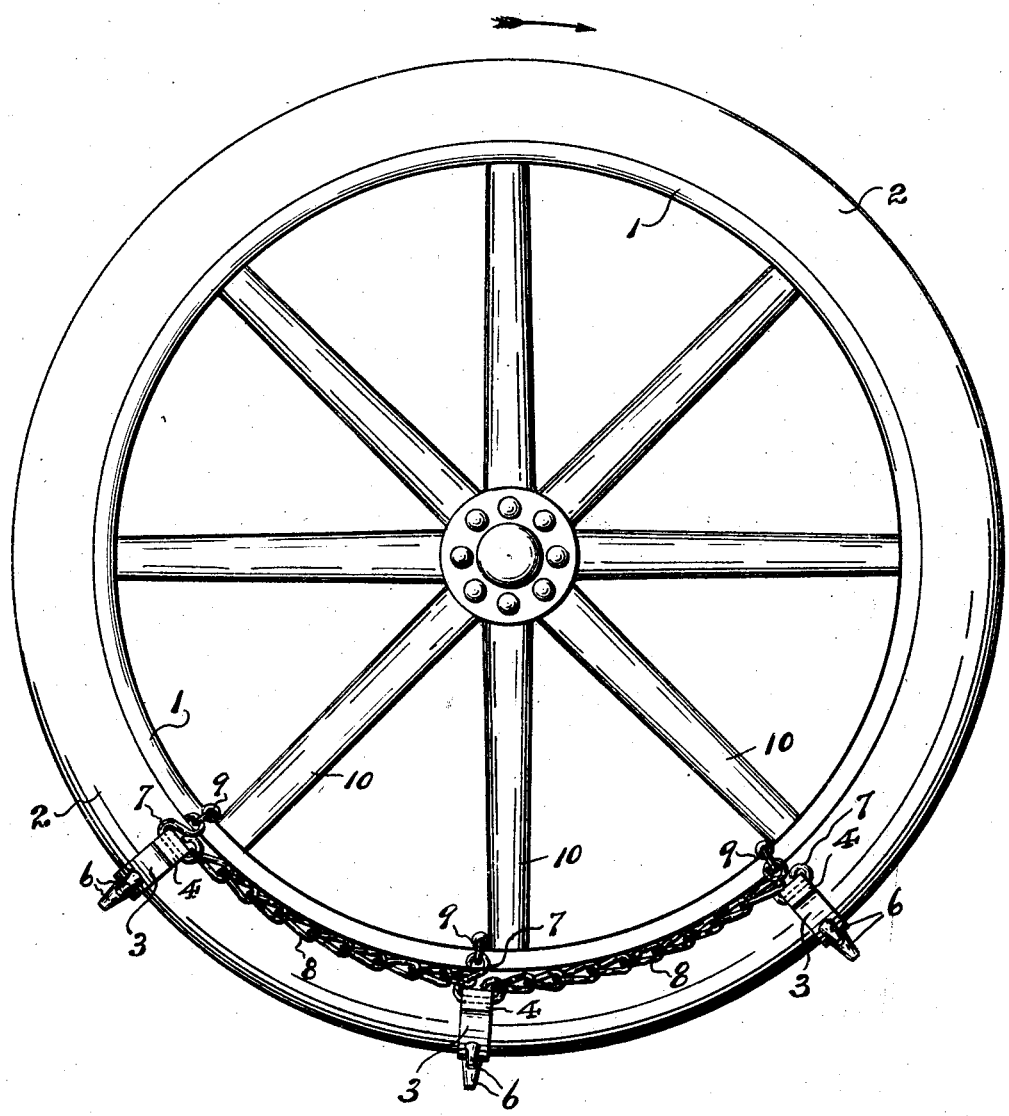
Figure 1 is a side elevation of an autovehicle wheel, showing the novel detachable spur device operatively arranged therewith.

Referring now to said drawings, the reference-character 1 indicates a driving wheel of an auto-vehicle upon the rim of which is mounted the usual tire 2, which may be either of the solid or the pneumatic type.

The novel spur element comprises a longitudinally bowed main body 3, having at each end an outwardly and longitudinally projecting lug 4, provided with a horizontal transverse opening 5 forming an eye. Integrally connected with the outer or under side of the bowed main body 3 are a plurality of outwardly, and preferably radially, projecting tapered spur members 6.

Preferably said novel spur elements are used in groups of three, but if desired a single element may be employed or in groups of more or less than three. When the said spur elements are used in groups, as illustrated in the drawings, there is connected with each end of each spur element, through the openings 5 forming the eyes thereof, a link element 7. Said spur elements are interconnected together by intermediate flexible ties, preferably in the form of chains 8 having their respective ends coupled with the respective link elements 7 of adjoining spur elements.

When applying the thus interconnected spur elements to the treads of an auto vehicle wheel 1, the spur elements are arranged transversely of the tire 2 and by virtue of their bowed shape are adapted to laterally embrace the said tire. The spur elements are positioned adjacent to the spoke positions of the wheel, and a transverse anchor or attaching chain or tie 9 is interconnected between the opposite link elements 7 of each spur element, so as to cross over the rim of the wheel behind a spoke 10 thereof, thus firmly holding the group of spur elements in operative relation to the wheel tread. When the spur elements are thus operatively related to the wheel, the spur members 6 are disposed to project outwardly from the wheel tread, so that as power is applied to drive the wheel, the rotation of the latter moves the spur elements rearwardly so that the weight of the vehicle drives the spur members 6 through to the bottom of the soft spot in which the vehicle is stalled or mired, said spur members digging into the ground so as to provide a purchase to the leverage of the wheel, whereby the vehicle is caused to move forward, and eventually out of and free from the mud, sand, deep snow or the like which has interfered with the proper traction of the driving wheels. Since the anchor or attaching chains or ties 9 cross the wheel rims behind the spokes 10, the latter drag upon the chains or ties 9, so as to prevent slipping or displacement of the attached spur elements.

The attaching chains 9 obviously permit swinging of the arcuate bodies 3 in the plane of the wheel, which allows each encircling member made up of an arcuate body and chain to lie as it is brought under strain in a single plane transverse to the wheel rim and tread, and as the strain increases the body 3 simply slips along the tread tightening itself thereon so that the spurs always project and said body cannot turn edgewise. The attaching chains 9 also permit hinge action in a direction perpendicular to the plane of the wheel, so that the encircling member made up of the chain and arcuate body 3 may under strain close tightly about the wheel rim and tread. By my invention, therefore, the encircling member automatically tightens itself upon a wheel, by use, and holds the body part 3 in rigid projecting position.

From the foregoing description it will be apparent that my novel detachable spur device provides a very efficient means for dislodging a mired or stalled auto-vehicle, the same being of a simple character, easily attached or detached from the wheel, and well adapted to quickly aid the traction of the wheel, and consequently to prevent spinning thereof when mired.

Referring to Figures 3 and 4 of the accompanying drawings, I have shown therein a slightly modified design and construction of spur element per se, in which, instead of providing a plurality of outwardly projecting spur members 6, I provide an integrally formed outwardly projecting longitudinal fin 11, which functions in substantially the same manner, as above described as to said spur members 6.

I claim:—

1. In a device of the character described, a rigid traction band for transverse disposition over a tire tread and incapable of rolling thereon, a hook at one end of said band centered thereon circumferentially of the tire and adapted to lie at one side of the tire and a chain secured to the other end of said band at the center thereof circumferentially of the tire and adapted to be passed around the felly of the wheel and one of its links hooked onto said hook, said traction band and hook and chain forming a rim-encircling member which as put on a tire is necessarily loose transversely and circumferentially of the tire at both the inside and the outside of the rim and in which as the band engages the ground it slides without rolling until it wedges tight on the tread and the chain provides flexibility to permit such sliding until it is thereby drawn tight against the felly.

2. In a device of the character described, a plurality of encircling members each comprising a traction band for transverse disposition over a tire tread and incapable of rolling thereon and a flexible connection adapted to extend between the ends of said traction band around the felly of the wheel, and chains connecting said encircling members at opposite sides of the wheel.

3. In a device of the character described, a plurality of encircling members each comprising a traction band for transverse disposition over a tire tread and incapable of rolling thereon and a flexible connection adapted to extend between the ends of said traction band around the felly of the wheel, and chains connecting the ends of the traction band of one encircling member to the corresponding ends of the traction band of the next encircling member.

In testimony that I claim the invention set forth above I have hereunto set my hand this 24th day of June, 1920.

DE WITT H. WHEATON.